April 11, 1961 R. D. RUNCIMAN 2,978,707

AUTOMATIC MACHINES FOR MOUNTING ELECTRICAL COMPONENTS ON BASE MEMBERS

Filed June 10, 1959 6 Sheets-Sheet 1

INVENTOR
ROBERT DAVIDSON RUNCIMAN
BY [signature]
ATTORNEYS

April 11, 1961    R. D. RUNCIMAN    2,978,707

AUTOMATIC MACHINES FOR MOUNTING ELECTRICAL COMPONENTS ON BASE MEMBERS

Filed June 10, 1959    6 Sheets-Sheet 2

INVENTOR
ROBERT DAVIDSON RUNCIMAN
BY Kirschstein, Kirschstein & Ottinger
ATTORNEYS INVENTOR
ROBERT DAVIDSON RUNCIMAN
BY Fuschstein, Fuschstein & Ottinger
ATTORNEYS April 11, 1961

R. D. RUNCIMAN 2,978,707

AUTOMATIC MACHINES FOR MOUNTING ELECTRICAL COMPONENTS ON BASE MEMBERS

Filed June 10, 1959

6 Sheets-Sheet 4

INVENTOR
ROBERT DAVIDSON RUNCIMAN
BY Kirschstein, Kirschstein, Ottinger
ATTORNEYS April 11, 1961 R. D. RUNCIMAN 2,978,707

AUTOMATIC MACHINES FOR MOUNTING ELECTRICAL COMPONENTS ON BASE MEMBERS

Filed June 10, 1959

6 Sheets-Sheet 5

INVENTOR
ROBERT DAVIDSON RUNCIMAN
BY Fischlein, Fischlein & Ottinger
ATTORNEYS

April 11, 1961 R. D. RUNCIMAN 2,978,707

AUTOMATIC MACHINES FOR MOUNTING ELECTRICAL COMPONENTS ON BASE MEMBERS

Filed June 10, 1959 6 Sheets-Sheet 6

INVENTOR
ROBERT DAVIDSON RUNCIMAN
BY Kurschke, Kurschke & Otting [signature]
ATTORNEYS United States Patent Office 2,978,707

Patented Apr. 11, 1961

2,978,707

AUTOMATIC MACHINES FOR MOUNTING ELECTRICAL COMPONENTS ON BASE MEMBERS

Robert Davidson Runciman, Coventry, England, assignor to The General Electric Company Limited, London, England Filed June 10, 1959, Ser. No. 819,279

Claims priority, application Great Britain June 19, 1958

7 Claims. (Cl. 1—323)

This invention relates to automatic machines for mounting electrical components on base members, for example "printed" circuit panels.

The invention is concerned in particular with automatic machines of the kind adapted to mount electrical components, each having a pair of wire leads projecting in opposite directions, on base members.

It is an object of the present invention to provide an automatic machine of the kind specified which is highly reliable in operation and which is simple to set up initially.

According to one aspect of the present invention, an automatic machine of the kind specified comprises a magazine for holding a plurality of the components, an insertion head, and feeding means for feeding one component at a time from the magazine into the insertion head, the insertion head comprising means for cutting the leads of a component to a desired length, means for bending the leads of a component so that the ends of the leads are pointed towards the base member on which the component is to be mounted, and a reciprocable forcing member for moving a component towards the base member so that the ends of the leads of the component are inserted into the holes in the base member, the arrangement being such that the leads of a component are cut during a return stroke of the forcing member and are inserted into the holes in the relevant base member during the next operating stroke of the forcing member.

It should be understood that by the term "return stroke" is meant a movement of the forcing member away from the base member and that by the term "operating stroke" is meant a movement of the forcing member towards the base member.

According to another aspect of the invention, an automatic machine of the kind specified comprises a magazine for holding a plurality of the components, an insertion head, and feeding means for feeding one component at a time from the magazine into the insertion head, the insertion head comprising means for cutting the leads of a component to a desired length, means for bending the leads of a component so that the ends of the leads are pointed towards the base member on which the component is to be mounted, and a reciprocable forcing member for moving a component towards the base member so that the ends of the leads of the component are inserted into holes in the base member, said feeding means including pushing means for intermittently pushing at least one component towards the desired initial location of each component in the insertion head, said pushing means being arranged to be actuated by movement of the forcing member.

One automatic component mounting machine in accordance with the invention will now be described by way of example with reference to the accompanying drawings, in which.

Figure 3:
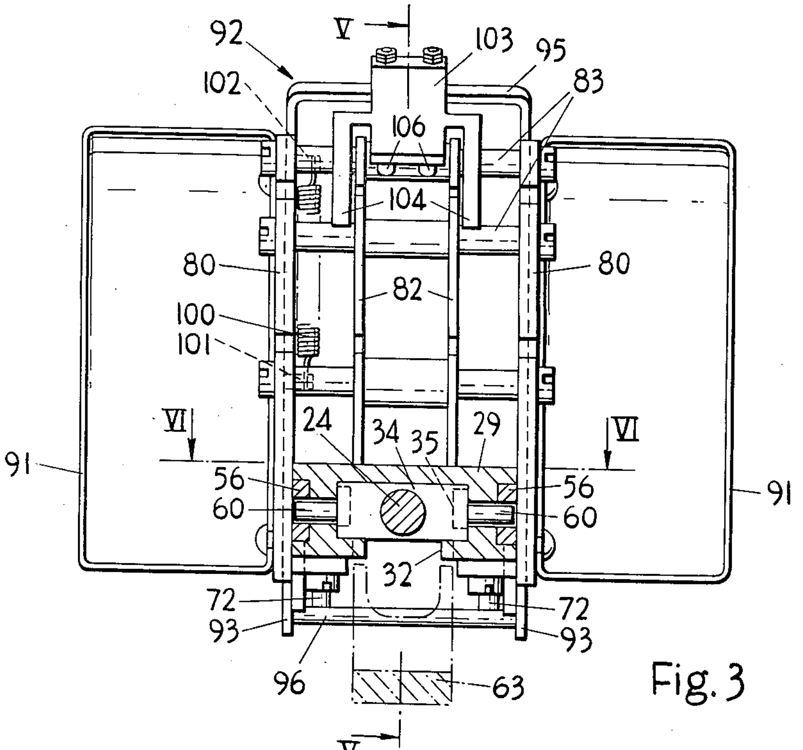
Figure 3 is a sectional plan view of the machine with the anvil assembly 63 and the magazine 78 removed, the section being taken along the line III—III of Figure 2.
Figure 6:
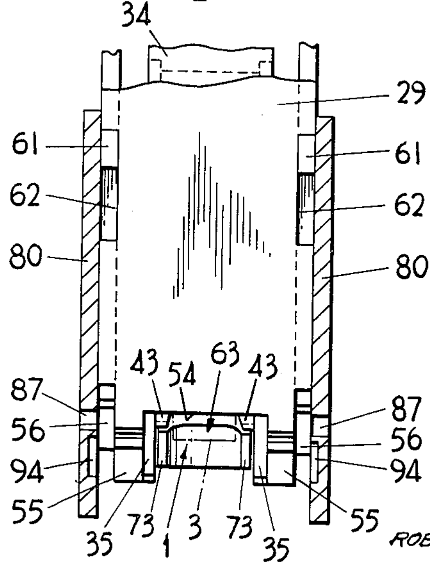
Figure 7:
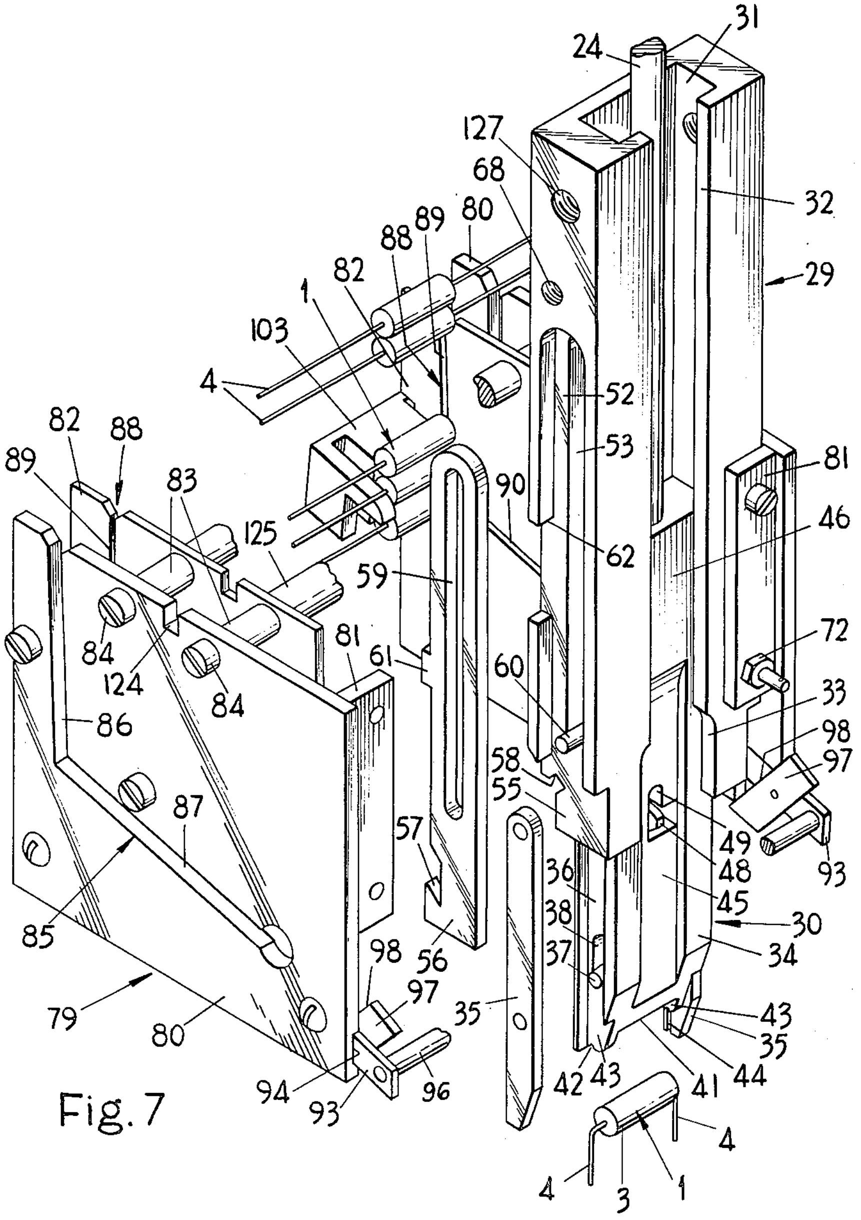

Figure 6 is a rear sectional elevation of the lower part of the machine with the containers 91 and the carriage 92 removed and with the forcing member 34 about to engage with the leads of a component 1, the section being taken along the line VI—VI of Figure 3; and Figure 7 is an exploded perspective view of part of the insertion head and part of the feeding device 79 of the machine.

The component mounting machine, in conjunction with a plurality of similar machines, is designed to form part of an in-line assembly machine such as is described in United States Patent No. 2,890,456. The in-line assembly machine includes a track along which are pushed a number of printed circuit panels each mounted on, and located in a fixed position with respect to, a supporting rectangular platen, and the component mounting machines are mounted at intervals along the length of the track. The platens are arranged to be moved along the track intermittently so that they are positioned in sequence beneath the series of component mounting machines, the platens being located in position while these machines operate to mount electrical components on the printed circuit panels supported by the platens.

Referring to the drawings, the component mounting machine is designed to mount electrical components, such as resistors 1, on to printed circuit panels such as the panel 2; the resistors 1 each comprise a circular cylindrical body 3 and a pair of wire leads 4 which project from opposite ends of the body 3 coaxial with the body 3. The component mounting machine is designed first to trim the leads 4 of a resistor 1 to the desired length, then bend the outer portions of the leads 4 so that they project towards the panel 2, insert the ends of the leads 4 through an appropriate pair of a number of holes 5 drilled in the panel 2, and clinch the ends of the leads 4 against the metallic pattern formed on the underside of the panel 2 so that the resistor 1 is firmly mounted on the panel 2 as shown in Figure 1.

Figure 2:
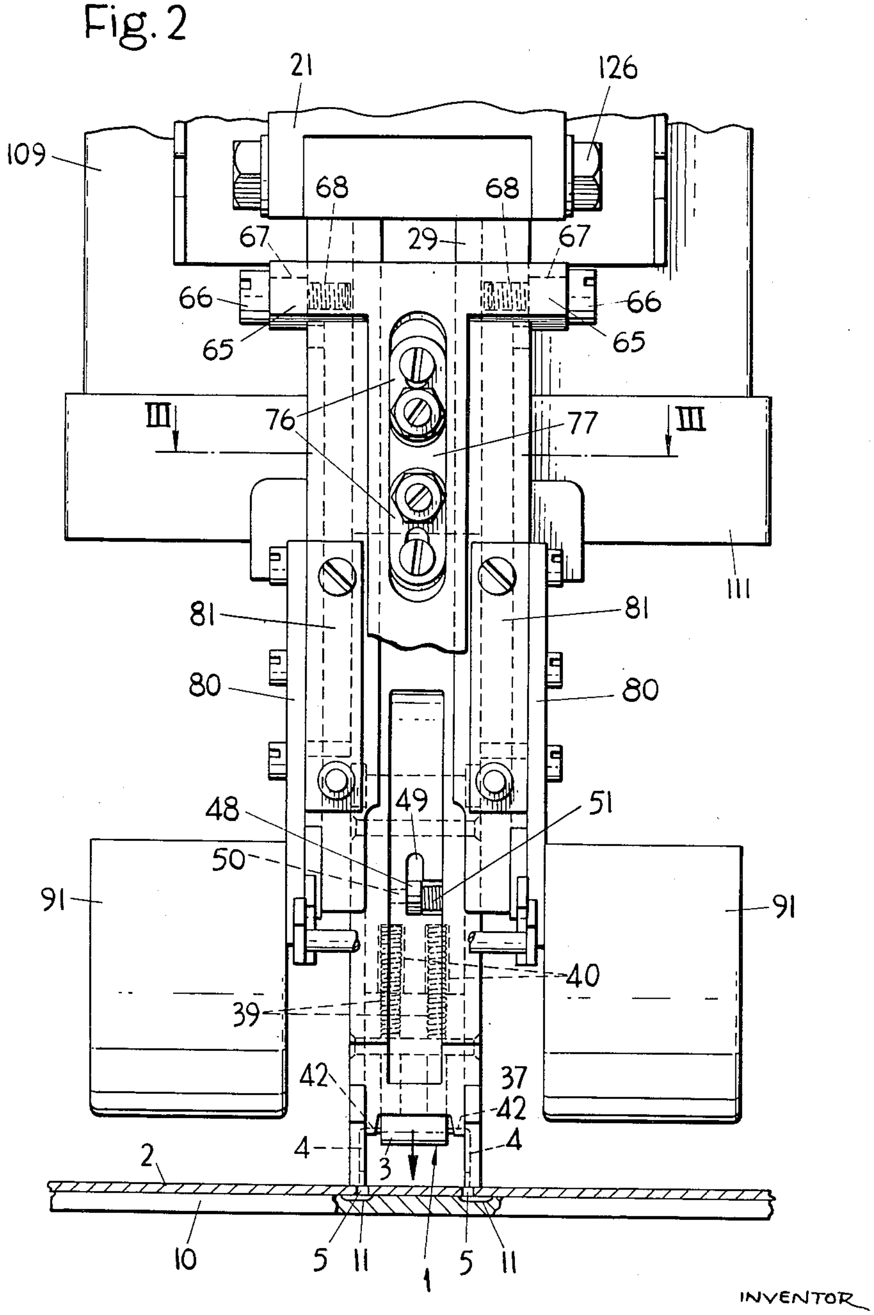
Figure 2 is a front elevation of the lower half of the machine with the machine about to insert a component into a printed circuit panel.

The long edges of the platen 6 on which the panel 2 is mounted are respectively sliding fits within two grooves 7 and 8 formed in the base 9 of the in-line assembly machine, the grooves 7 and 8 forming the above mentioned track along which the platens are pushed. The platen 6 has located on its upper surface an anvil plate 10 the upper surface of which has formed in it a number of pairs of concave grooves 11 (see Figure 2) corresponding in position to the holes 5; the arrangement of the grooves 11 is such that, when the lead wires 4 of a resistor 1 are inserted into a pair of the holes 5, the ends of the lead wires 4 strike the outer ends of the corresponding pair of grooves 11 and are thereby bent over against the underside of the panel 2 so that the resistor 1 is fixed in position relative to the panel 2. It should be appreciated that each groove 11 can be formed at any angle with respect to the line joining the centres of the relevant pair of holes 5 so that, when the lead wires 4 of a resistor 1 are inserted into the holes 5, the wires 4 will be bent over towards the appropriate parts of the metallic pattern of the panel 2.

Figure 1:
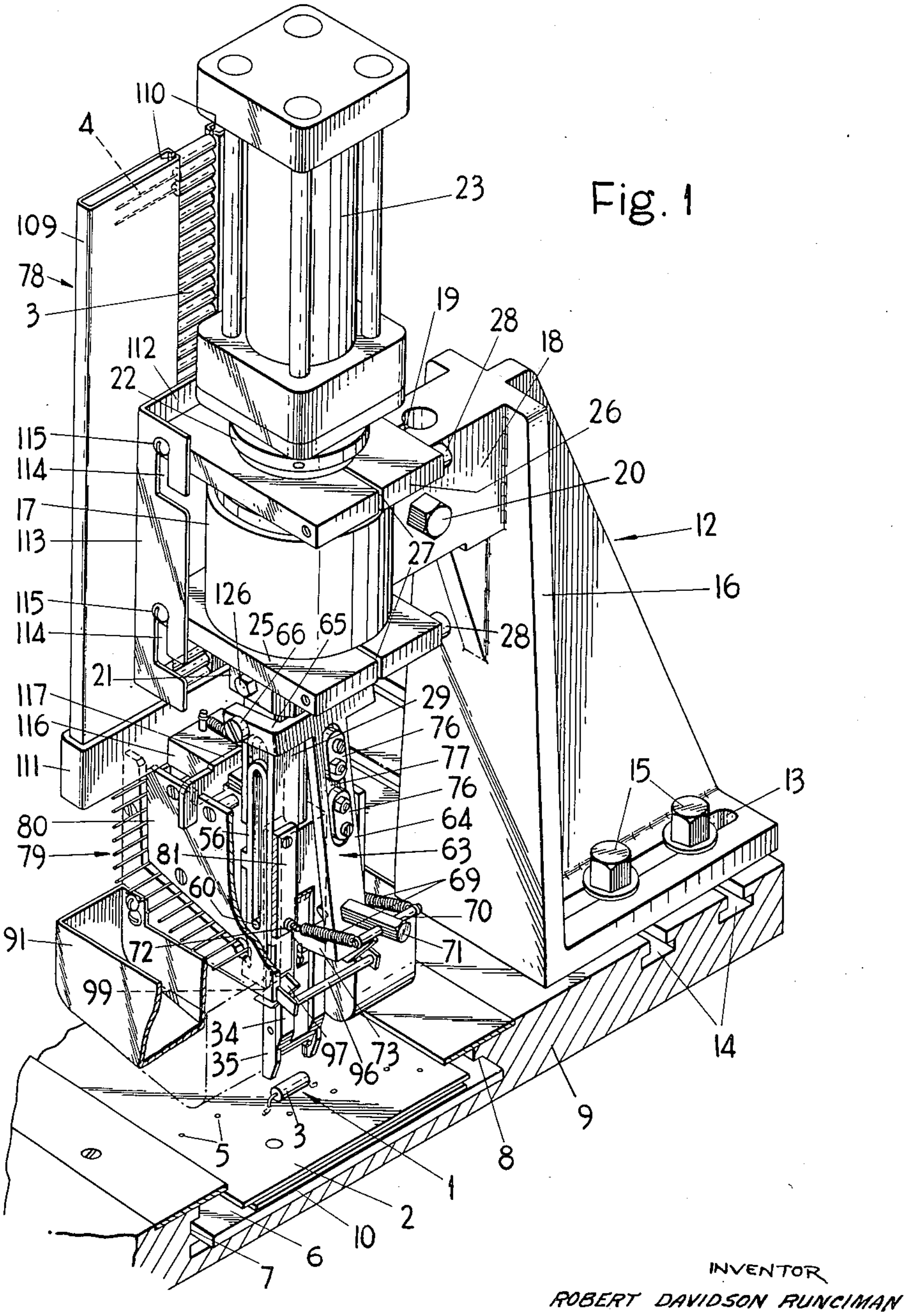
Figure 1 is a perspective view of the whole machine, a portion of a support plate 80 and a container 91 being shown broken away for the sake of clarity.

As shown in Figure 1, the component mounting machine includes a support 12 which is adjustably mounted on the base 9. Two slots 13 (only one of which is seen in the drawings) are formed in the base of the support 12, the slots 13 extending transversely to the length of the in-line assembly machine, and two longitudinal recesses 14 are formed in the upper surface of the base 9, the recesses 14 each having an inverted T-shaped cross-section. The support 12 is secured to the base 9 by means of bolts 15 and nuts (not seen), the shanks of the bolts 15 passing through the slots 13 and the nuts being disposed in the wider parts of the recesses 14. Thus, it will be appreciated that the position of the support 12 with respect to the base 9 can be adjusted both in directions parallel to, and transverse to, the length of the in-line assembly machine.

The support 12 includes a vertically extending portion 16, a hollow circular cylindrical portion 17, and a portion 18 connecting the cylindrical portion 17 to the portion 16. A longitudinal slot (not seen in the drawings) is formed in the cylindrical portion 17, this slot being continuous with a vertical slot 19 formed in the portion 18; the inner diameter of the cylindrical portion 17 can be varied by adjustment of a horizontally extending bolt 20 whose shank passes through the portion 18. A sleeve 21 passes through, and is normally tightly gripped by, the cylindrical portion 17, and it will be appreciated that the angular position of the sleeve 21 with respect to the cylindrical portion 17 can be adjusted after first loosening the bolt 20, the bolt 20 being subsequently retightened. A collar 22 screws into the upper end of the sleeve 21, the collar 22 being normally held in its desired position with respect to the sleeve 21 by means of a nut (not seen).

A double-acting vertically extending air cylinder 23 is supported on the collar 22, the lower end of a piston rod 24 associated with the air cylinder 23 projecting below the lower end of the cylindrical portion 17.

Two supporting plates 25 and 26 surround the sleeve 21, the plate 25 being disposed below the cylindrical portion 17 and the plate 26 being disposed above the cylindrical portion 17. The plates 25 and 26 are respectively provided with slots 27 and with bolts 28 to enable the plates 25 and 26 to be clamped in any desired angular position with respect to the sleeve 21.

The component mounting machine includes an insertion head which will now be described in detail with particular reference to Figure 7 of the drawings. The insertion head comprises a fixed elongated vertically extending block 29 and an elongated vertically extending reciprocable inserter assembly 30 which is mounted on the block 29 so as to be slidable vertically with respect to the block 29. The block 29 has a substantially rectangular horizontal cross-section and is provided with a centrally disposed longitudinal recess 31 also having a rectangular cross-section. One main face of the block 29 has formed in it a longitudinal slot 32 which opens into the recess 31, the lower portion of the slot 32 being formed as a wider portion 33.

The inserter assembly 30 includes a forcing member 34, having a generally rectangular horizontal cross-section, and two bending arms 35 respectively disposed adjacent the two narrow sides of the forcing member 34, the forcing member 34 and the bending arms 35 together having a sliding fit within the recess 31 of the block 29. The bending arms 35 are respectively sliding fits within two vertically extending recesses 36 formed in the narrow sides of the forcing member 34. The arms 35 are connected together by means of two spindles 37 which are disposed one above the other and which respectively pass through two slots 38, the slots 38 extending across the whole width of the forcing member 34 and having vertical dimensions considerably greater than the diameter of the spindles 37.

The arms 35 are biased downwardly with respect to the forcing member 34 by means of two helical springs 39 (see Figure 2) so that normally the lower ends of the arms 35 project below the lower end of the forcing member 34 as shown in Figure 1. The springs 39 are respectively housed in two vertically extending circular cylindrical holes 40 formed in the lower part of the forcing member 34, the holes 40 being closed at their upper ends, and the ends of each spring 39 respectively bear against the closed end of the relevant hole 40 and against the lower of the two spindles 37.

A recess 41 is centrally formed in the lower end of the forcing member 34, the recess 41 extending for the major part of the width of the forcing member 34 and having a width slightly greater than the lengths of the bodies 3 of the resistors 1. Two horizontal grooves 42 are respectively formed in the bases of the two parts 43 of the forcing member 34 bounding the ends of the recess 41, and two vertical grooves 44 are respectively formed in the inner faces of the two bending arms 35; the disposition of the grooves 42 and of the grooves 44 is such that their axes all lie in the same vertical plane.

That main face of the forcing member 34 adjacent the slot 32 formed in the block 29 is cut away to form a lower recessed cam surface 45, the upper part of this main face forming an upper cam surface 46 which stands proud of the lower cam surface 45. The opposite main face of the forcing member 34 is flat except for an inclined surface 47 (see Figures 4 and 5) which slopes inwardly towards the upper edge of the recess 41.

A disappearing cam 48 is mounted in a recess 49 formed in the forcing member 34. The cam 48 is pivoted about a spindle 50 (see Figures 2, 4 and 5) and is biased by means of a torsion spring 51 (see Figure 2) in a clockwise direction (with respect to Figures 4 and 5) so that normally the cam 48 is maintained in the position shown in Figure 4, the cam 48 in this position projecting a short distance proud of the cam surface 45. The recess 49 is so shaped that the cam 48 can be pivoted in an anti-clockwise direction from its position shown in Figure 4 into a position in which it is disposed wholly inside the recess 49.

Two vertically extending shallow recesses 52 are respectively formed in the two narrow side faces of the block 29, each of the recesses 52 being open at its lower end. The recesses 52 respectively communicate with the central recess 31 in the block 29 by means of two vertical slots 53 respectively formed in the bases of the recesses 52 and extending along the whole length of the recesses 52. A recess 54 (see Figure 6) having a length somewhat greater than the length of a body 3 of a resistor 1 is formed in the lower end of the block 29 opposite slot 32, and two fixed blade members 55 are formed integral with the lower end of the block 29, the members 55 being disposed on either side of the recess 54.

Two flat movable blade members 56 are respectively disposed in the recesses 52, the members 56 being friction fits, but slidable, within the recesses 52. Two V-shaped notches 57 are respectively formed in the movable blade members 56 adjacent their lower ends, and two inverted V-shaped notches 58 are respectively formed in the fixed blade members 55. The arrangement of the notches 57 and 58 is such that each notch 57 can co-operate with the adjacent notch 58 so that adjacent edges of each co-operating pair of notches 57 and 58 form a pair of cutting edges for a lead wire 4 of a resistor 1; the cutting action is performed by causing the movable blade members 56 to move upwards with respect to the fixed blade members 55 so that each wire 4 of the resistor 1 is first trapped between, and then cut by, a pair of co-operating notches 57 and 58.

Two vertically extending slots 59, closed at both ends, are respectively formed in the movable blade members 56. The movable blade members 56 are arranged to be moved up and down relative to the block 29 by means of two horizontally extending pins 60 which respectively project from the two narrow sides of the forcing member 34, the pins 60 respectively passing through the slots 53 in the block 29 and projecting into the slots 59. Movement of the movable blade members 56 relative to the block 29 is limited by means of two projections 61 respectively formed on the members 56 which respectively project into two cut-away regions 62 formed in corresponding bounding sides of the vertical recesses 52 of the block 29.

Figure 4:
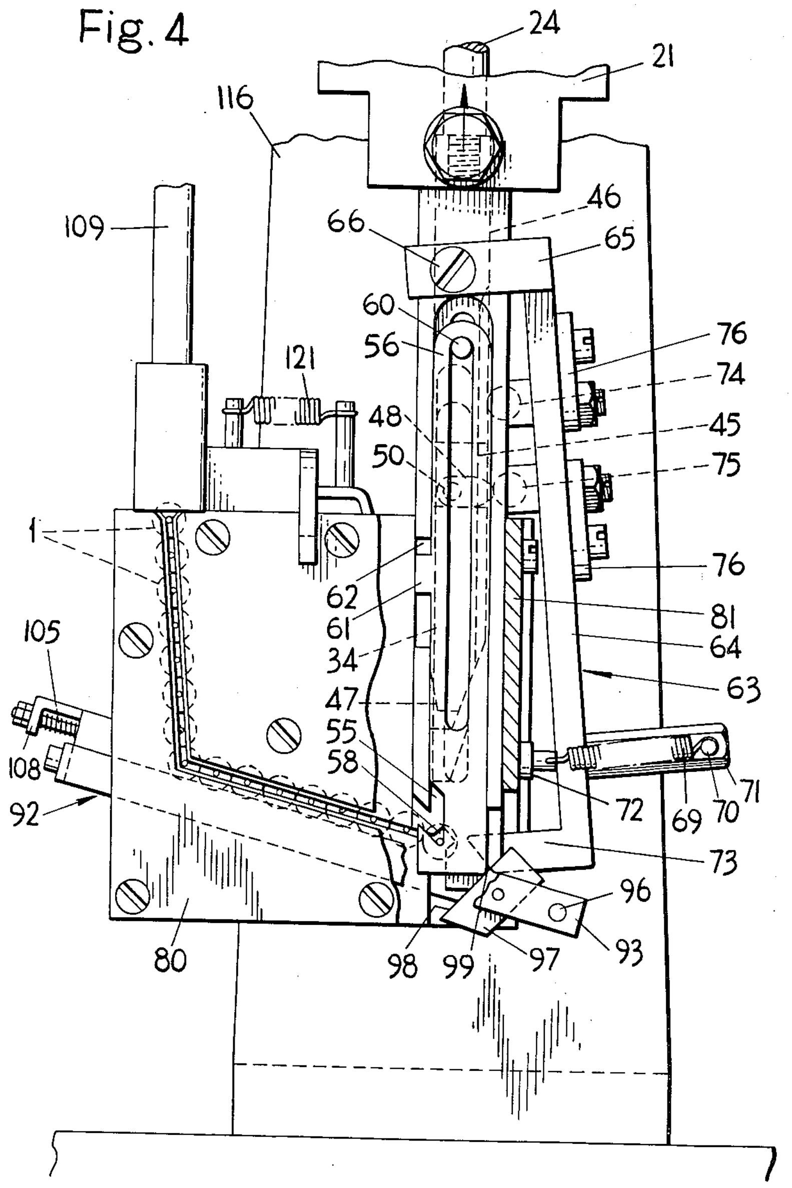
Figure 4 is a side elevation of the lower half of the machine with the piston rod 24 approaching the end of its upward stroke, a portion of one support plate 80 being shown broken away for the sake of clarity.
Figure 5:
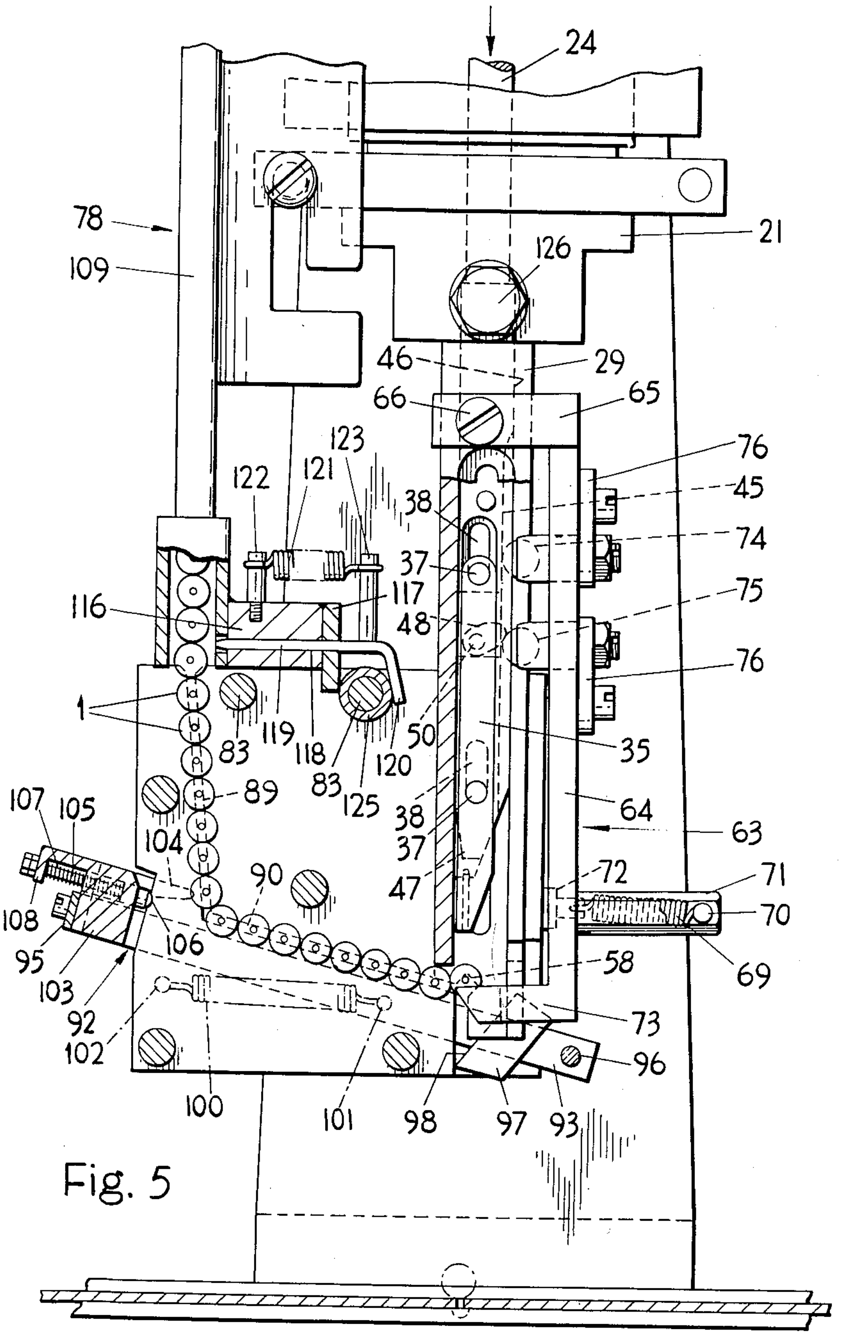
Figure 5 is a part sectional side elevation of the lower half of the machine shortly after the piston rod 24 has commenced its downward stroke, the section being taken along the line V—V of Figure 3.

Referring now particularly to Figures 1, 4 and 5, the component mounting machine also includes an anvil assembly 63 which includes a T-shaped support 64 disposed adjacent that main face of the block 29 in which the longitudinal slot 32 is formed, the cross-bar of the T being substantially parallel to the main faces of the block 29. Two support arms 65 project perpendicularly from the ends of the cross-bar of the T-shaped member 64 towards the block 29. The arms 65 are disposed on each side of the upper part of the block 29, and the shanks of two bolts 66 respectively pass through two holes 67 (see Figure 2) formed in the arms 65 and screw into two threaded holes 68 formed in the block 29. The anvil assembly 63 is pivotable about the shanks of the bolts 66 and is biased towards the block 29 (in a clockwise direction with respect to Figure 5) by means of two springs 69. Corresponding ends of the springs 69 are attached to the ends of a rod 70 which passes through a supporting post 71 projecting from the support member 64, and the other ends of the springs 69 are respectively attached to two bolts 72 which are secured to the block 29. Two anvil arms 73 project perpendicularly from the lower end of the support member 64, the spacing apart of the arms 73 being slightly greater than the length of the body 3 of a resistor 1; the arrangement of the anvil assembly 63 is such that, by pivoting the assembly 63 about the shanks of the bolts 66, the arms 73 can be moved into or out of the wider portion 33 of the vertical slot 32 formed in the block 29 when the lower end of the member 34 is above the level of the arms 73.

Two follower rollers 74 and 75 (see Figures 4 and 5) are mounted one above the other on the support member 64, the upper follower roller 74 being arranged to bear on one or other of the cam surfaces 45 and 46 and the lower follower roller 75 being designed to co-operate with the disappearing cam 48; the disappearing cam 48 is arranged to be operative only during an upward movement of the forcing member 34 with respect to the follower roller 75. The follower rollers 74 and 75 are respectively secured to two fixing members 76 which are adjustably clamped in a recess 77 (see Figure 1) formed in the support member 64; thus, the position of each follower roller 74 or 75 can be adjusted in directions parallel to the length of the support member 64.

The insertion head of the machine is arranged to be fed with resistors 1 supplied from a removable magazine, such as the magazine 78, designed to be fitted on the machine, and the machine includes a feeding device 79 for feeding resistors 1 from the magazine 78 to the insertion head.

Referring now particularly to Figure 7, the feeding device 79 includes two vertical and parallel rectangular support plates 80 which are secured to the block 29 by means of flanges 81 which are welded to the plates 80; the major parts of the plates 80 are disposed on that side of the block 29 remote from the anvil assembly 63. The feeding device 79 also includes two guide plates 82 disposed between, and respectively spaced equal distances from, the support plates 80. The guide plates 82 are mounted on rods 83, the support plates 80 being secured to the ends of the rods 83 by means of screws 84.

Two slots 85 are respectively formed in the two support plates 80, the slots 85 being similar in shape and in register with each other. Each slot 85 consists of a steeply sloping portion 86 and a gradually sloping portion 87 which slopes away from the lower end of the portion 86 towards the insertion head; the upper end of each slot 85 is open and is flared for a purpose which will be made clear later, while the lower end of the slot 85 is formed as an enlarged closed portion. The guide plates 82 are also respectively provided with two slots 88 which are generally similar in shape to, and which correspond in position to, the slots 85; each slot 88 is open at both ends and consists of a steeply sloping portion 89 which is flared at its upper end and a gradually sloping portion 90. The slots 88 are narrower than the slots 85, the width of the slots 88 being slightly greater than the diameter of the leads 4 of a resistor 1. The arrangement of the plates 80 and 82 is such that a resistor 1 can pass between the plates 82 with its axis perpendicular to the plates 82, and with its lead wires 4 passing through the slots 88 and 85. Normally a continuous line of resistors 1 is contained in the feeding device 79, the bodies 3 of the resistors 1 abutting against each other as shown in Figure 5.

Two metal containers 91 are respectively removably attached to the outer surfaces of the support plates 80, the containers 91 being designed to catch those parts of the leads 4 of the resistors 1 cut off by the movable blade members 56.

Referring now particularly to Figures 3 and 5, the feeding device 79 also includes a carriage 92 which is movable towards and away from the insertion head. The base of the carriage 92 includes two inclined metal strips 93 which are respectively sliding fits within two inclined grooves 94 (see Figure 7) respectively formed in the inner faces of the plates 80. The strips 93 are joined together at one end by means of a transverse strip 95 which is formed integral with the strips 93, and are connected together at the other end by means of a rod 96.

Two lugs 97 are respectively secured to the inner main faces of the strips 93, the lugs 97 being respectively provided with two inclined cam surfaces 98 which are respectively arranged to co-operate with corresponding lower edges 99 of the movable blade members 56 as shown in Figure 4. The cam surfaces 98 are maintained in contact with the edges 99 by virtue of the fact that the carriage 92 is biased away from the insertion head by means of a spring 100, one end of the spring 100 being attached to a pin 101 secured to one of the metal strips 93, and the other end of the spring 100 being attached to a pin 102 secured to the corresponding plate 80. Thus, it will be appreciated that downward movement of the movable blade members 56 will bring about a movement of the carriage 92 towards the insertion head, and an upward movement of the members 56 will allow the carriage 92 to move away from the insertion head.

A block 103 is secured to the transverse strip 95, and two separating arms 104 are secured to, and disposed on either side of, the block 103, the arms 104 projecting towards the insertion head. The free ends of the arms 104 are respectively disposed in the regions of the junctions between the slots 89 and the slots 90 and the arms 104 are so designed that, when the carriage 92 is moved towards the insertion head, the arms 104 will separate those resistors 1 whose leads 4 are disposed in the slots 89 from those resistors 1 whose leads 4 are disposed in the slots 90, the leads 4 of the lowermost resistor 1 of the array of resistors 1 above the arms 104 respectively resting on the arms 104. The leading edges of the arms 104 are chamfered so as to prevent these edges locking against the leads 4 of a resistor 1.

Two pusher rods 105 are slidably mounted in the block 103, the axes of the rods 105 being parallel to the slots 90. Those ends of the rods 105 nearer the insertion head are respectively formed as two enlarged portions 106, and the rods 105 are normally maintained in the position shown in Figure 5 with respect to the block 103 by means of two compressed springs 107, the ends of each spring 107 respectively bearing against the portion 106 of the relevant rod 105 and against a flange 108 formed on the block 103. The rods 105 are so arranged that, when the carriage 92 is moved towards the insertion head, they engage with the body 3 of the adjacent resistor 1 of the line of resistors 1 whose leads 4 are disposed in the slots 90 and push this line of resistors 1 towards the insertion head; it should be appreciated that the springs 107 ensure that these resistors 1 are pushed resiliently by the rods 105, the rods 105 being capable of a movement from right to left (with respect to Figure 5) relative to the block 103 against the pressure exerted by the springs 107.

Referring now particularly to Figure 1, the magazine 78 includes two elongated tubular members 109 of rectangular cross-section. Two vertical slots 110, which extend for the whole length of the members 109, are respectively formed in those narrow sides of the members 109 disposed adjacent each other. The members 109 are secured together by means of a tubular member 111 which is secured around the lower ends of the members 109, and by means of a bracket 112. Two flanges 113, which are symmetrically disposed about the axis of the magazine 78, project perpendicularly from the bracket 112, and two L-shaped slots 114 are formed in each flange 113, the end of the horizontal part of each slot 114 being open. The slots 114 are respectively designed to accommodate the shanks of screws 115 which are screwed into the supporting plates 25 and 26, the slots 114 and screws 115 serving to locate the magazine 78 in its desired position with respect to the feeding device 79.

Referring now particularly to Figures 1 and 5, a bar 116 projects from the tubular member 111, the bar 116 being disposed on the same side of the members 109 as the bracket 112, and a bridge piece 117 is secured to that end of the bar 116 remote from the tubular member 111. A horizontal slot 118 is formed in the bar 116 and the bridge piece 117, and a rectangular plate 119, one pair of parallel edges of which are arranged at right angels to the main faces of the member 111, is a sliding fit in the slot 118; a downwardly and outwardly projecting flange 120 is formed integral with that end of the plate 119 remote from the member 111. The plate 119 is biased inwardly with respect to the member 111 by means of a spring 121, the ends of the spring 121 being respectively attached to two pins 122 and 123 respectively secured to the bar 116 and to the plate 119. The arrangement is such that, when the magazine 78 is not mounted in position on the machine, the plate 119 will project just over half way across the narrow cross-sectional dimension of the tubular member 111, inward movement of the plate 119 with respect to the member 111 being limited by virtue of the pin 123 coming into contact with the bridge piece 117.

The magazine 78 is designed to be located in position on the machine with the shanks of the screws 115 fitting in the upper ends of the slots 114, with the bridge piece 117 fitting in slots 124 (see Figure 7) formed in the upper edges of the plates 80 and 82, and with that surface of the flange 120 which faces the member 111 bearing against a sleeve 125 fitted around one of the rods 83. It will be appreciated that the operation of mounting the magazine 78 on the machine involves first a horizontal movement of the magazine 78 as the shanks of the screws 115 enter the slots 114 and then a downward movement which continues until the shanks of the screws 115 bear against the closed ends of the slots 114. The position of the sleeve 125 is such that, at the commencement of the downward movement of the magazine 78, the axis of the sleeve 125 is disposed below and slightly to that side of the lower edge of the flange 120 remote from the insertion head, so that as the magazine 78 descends the lower edge of the flange 120 comes into contact with, and then slides over, the surface of the sleeve 125 thereby causing the plate 119 to be moved away from the member 111; the plate 119 is moved in this manner to the position shown in Figure 5, at which stage the magazine 78 is in its desired located position with respect to the machine.

With the magazine 78 thus located in position, the lower ends of the slots 110 formed in the tubular members 109 are respectively substantially contiguous with the upper ends of the slots 89 of the guide plates 82 so that in operation resistors 1 can pass continuously from the magazine 78 to the feeding device 79 of the machine, the flared upper portions of the slots 86 and 89 facilitating the entry of the resistors 1 into the feeding device 79.

The magazine 78 is adapted to be filled with resistors 1 supplied in the form of strips comprising about 160 resistors 1, the bodies 3 of the resistors 1 being stuck to a strip of adhesive tape. The magazine 78 is filled by removing it from the machine, inserting the leads 4 of an end one of a strip of resistors 1 into the upper ends of the slots 110, and then pulling on the tape so that the tape is pulled away from the resistors 1 the leads 4 of which then slide down the slots 110. It will be appreciated that the resistors 1 are prevented from falling out of the bottom of the magazine 78 before it is mounted in position on the machine by virtue of the fact that the plate 119 projects into the tubular member 111.

It will be appreciated that the line of resistors 1 whose leads 4 are disposed in the grooves 86 and 89 of the plates 80 and 82 form a reserve so that, when the magazine 78 is empty, the magazine 78 can be replaced by a full magazine without interrupting the continuous supply of resistors 1 to the insertion head.

The assembly of the insertion head, feeding device 79 and magazine 78 is supported by the support 12 by virtue of the upper end of the block 29 being bolted to the lower end of the sleeve 21 by means of two bolts 126, the shanks of the bolts 126 respectively screwing into two threaded holes 127 (see Figure 7) formed in the block 29. The whole of this assembly is rotatable with respect to the support 12 through an angle of 280° about a vertical axis by virtue of the fact that the angular position of the sleeve 21 with respect to the cylindrical portion 17 can be adjusted. Also, since the position of the support 12 is adjustable in directions parallel to, and perpendicular to, the length of the base, the insertion head can be adjusted so that it can mount a resistor 1 in any desired position on the panel 2. The assembly is also adjustable in a vertical direction by adjustment of the longitudinal position of the sleeve 21 with respect to the cylindrical portion 17, so that the position of the block 29 with respect to the base 9 can be varied according to the thickness of the printed circuit panel 2 being used. The lowermost position of the piston rod 24 with respect to the sleeve 21 (in the absence of the insertion head being secured to the sleeve 21) can be varied by adjustment of the position of the collar 22.

The operation of the machine will now be described. Firstly, the position of the insertion head is adjusted to its desired position with respect to the printed circuit panel 2 disposed beneath it. This adjustment is carried out by first moving the inserter assembly 30 downwards until the bending arms 35 engage with a panel 2, adjusting the position of the insertion head until the grooves 44 in the bending arms 35 are aligned with that pair of holes 5 in the panel 2 into which it is desired to insert the leads 4 of a resistor 1, and then securing the insertion head in position.

When the piston rod 24 of the air cylinder 23 is in its uppermost position, the insertor assembly 30 and the movable blade members 56 are fully raised with respect to the fixed block 29, the carriage 92 is fully retracted from the insertion head, the anvil arms 73 are disposed beneath the bending arms 35, and a resistor 1 is supported above the anvil arms 73 in a manner to be described later; the leads 4 of the resistor 1 have already been cut to the desired length during the last up-stroke of the piston rod 24 and this cutting action will also be described later.

During the downward stroke of the piston rod 24, the lower ends of the bending arms 35 first engage with those parts of the leads 4 of the resistor 1 projecting on either side of the anvil arms 73 and then bend said parts of the leads 4 downwards over the arms 73; the grooves 44 in the bending arms 35 are aligned in a vertical plane with the leads 4, and as the leads 4 are bent they slide in the grooves 44. It should be appreciated that the springs 39 in the forcing member 34 are sufficiently strong to maintain the bending arms 35 in their lowermost position with respect to the forcing member 34 while the leads 4 are being bent by the arms 35.

Just prior to the leads 4 being fully bent by the arms 35, the anvil arms 73 begin to move away from the insertion head by virtue of the upper cam surface 46 engaging with the upper follower roller 74. The parts 43 of the forcing member 34 then engage with the horizontal parts of the leads 4, the horizontal grooves 42 formed in the parts 43 fitting around these parts of the leads 4, and the leads 4 are trapped momentarily between the parts 43 and the anvil arms 73 before the arms 73 have been wholly moved from beneath the forcing member 34; a sharp right-angled bend is thereby formed in each lead 4, the extremities of the leads 4 pointing vertically downwards. As shown in Figure 7, those lower edges of the parts 43 facing the anvil assembly 63 are chamfered so as to prevent the forcing member 34 being jammed against the anvil arms 73.

The anvil arms 73 then complete their movement from beneath the forcing member 34 so that the forcing member 34 can continue its downward movement, and thereafter the resistor 1 is held in position by virtue of the vertically extending parts of the leads 4 respectively tightly fitting in the grooves 44 in the bending arms 35.

The whole of the inserter assembly 30 continues its downward movement until the lower ends of the bending arms 35 engage with the printed circuit panel 2. Thereupon, the bending arms 35 are pressed resiliently against the panel 2 and the forcing member 34 moves downwards with respect to the arms 35 against the pressure of the springs 39, the forcing member 34 causing the vertically extending parts of the leads 4 to slide downwardly in the grooves 44. The ends of the leads 4 then enter the desired pair of holes 5 in the panel 2 and are bent inwardly underneath the panel 2 by virtue of the forcing member 34 pressing them against the grooves 11 in the anvil plate 10, the leads 4 being thereby bent into engagement with the appropriate parts of the metallic pattern of the panel 2; at this stage, the piston rod 24 is at its lowermost position.

Also during the downward stroke of the piston rod 24, the movable blade members 56 are moved downwards by virtue of the pins 60 striking the lower ends of the slots 59 in the members 56. The downward movement of the members 56 brings about a movement of the carriage 92 towards thei nsertion head in the manner previously described, so that the line of resistors 1 whose leads 4 are disposed in the slots 87 and 90 is caused to be pushed towards the insertion head by the pusher rods 105, the body 3 of the leading resistor 1 being pressed resiliently against that main face of the forcing member 34 remote from the anvil assembly 63 and being accommodated by the recess 54 in the lower end of the fixed block 29.

During the upward stroke of the piston rod 24, as soon as the upper edge of the recess 41 formed in the lower end of the forcing member 34 has been raised above the anvil arms 73, the arms 73 are caused to be moved back beneath the forcing member 34 by virtue of the upper follower roller 74 sliding on to the recessed cam surface 45. At this stage, the movable blade members 56 are still in their lowermost position so that the carriage 92 is still being urged towards the insertion head. As the upper end of the recess 41 is being moved upwardly past the anvil arms 73, the line of resistors 1 whose leads 4 are disposed in the slots 87 and 90 are pushed along the length of the slots 87 and 90 towards the insertion head, the body 3 of the leading resistor 1 sliding along the inclined surface 47 formed on the forcing member 34. As soon as the upper edge of the recess 41 has moved above the axis of the body 3 of the leading resistor 1, this movement is arrested by virtue of the free ends of the anvil arms 73 (which have now been moved back beneath the forcing member 34) engaging with the leads 4 of the leading resistor 1.

The movable blade members 56 are then raised by virtue of the pins 60 striking the upper ends of the slots 59 in the members 56. Immediately after the members 56 have commenced this upward movement, the anvil arms 73 are momentarily moved away from the feeding device 79 by virtue of the disappearing cam 48 engaging with the lower follower roller 75. This movement of the anvil arms 73 allows the leads 4 of the leading resistor 1 in the feeding device 79 to move out of the slots 90 and drop a short distance into the V-shaped notches 57 in the movable blade members 56; that resistor 1 adjacent the resistor 1 now supported by the members 56 is prevented from falling out of slots 90 by virtue of the bodies 3 of these two resistors 1 being in contact with each other. At this stage, the arrangement is as shown in Figure 4. The resistor 1 supported by the movable blade members 56 is then carried upwards a short distance by the members 56, and the ends of the leads 4 of the resistor 1 are sheared off in the manner previously described; after this resistor 1 has been thus raised, the leads 4 of the leading resistor 1 in the feeding device 79 are respectively in engagement with those parts of the adjacent edges of the movable blade members 56 disposed beneath the notches 57. As the leads 4 are being cut, the anvil arms 73 move back into position beneath the forcing member 34 and immediately after the cutting operation has been completed the piston rod 24 reaches its uppermost position. After the leads 4 of the relevant resistor 1 have been cut and before the next downward stroke of the piston rod 24 commences, the resistor 1 is supported by virtue of the newly formed ends of the leads 4 respectively bearing resiliently (due to the inherent resilience of the leads 4) against the inner main faces of the movable blade members 56; while the resistor 1 is thus supported, its leads 4 are disposed a few thousands of an inch above the anvil arms 73. It should be appreciated that the leads 4 of the resistor 1 are accurately located in position directly beneath the grooves 44 in the bending arms 35 by virtue of the leads 4 being held in the apices of the notches 58 formed in the fixed blade members 55.

After a short interval to enable the next printed circuit panel to be moved into position beneath the insertion head, the sequence of operations is repeated, the next resistor 1 being mounted on the panel newly positioned beneath the head. This process is repeated indefinitely.

I claim:

1. An automatic machine for mounting electrical components, each having a pair of wire leads projecting in opposite directions, on base members, the machine comprising a magazine for holding a plurality of the components, an insertion head, and feeding means for feeding one component at a time from the magazine into the insertion head, the insertion head comprising means for cutting the leads of a component to a desired length, means for bending the leads of a component so that the ends of the leads are pointed towards the base member on which the component is to be mounted, and a reciprocable forcing member for moving a component towards the base member so that the ends of the leads of the component are inserted into holes in the base member, said cutting means including a pair of movable members which respectively have two cutting edges that are arranged to cooperate with two cutting edges formed on at least one fixed member, said movable members being movable with the forcing member during at least part of a return stroke of the forcing member so as to be moved past the cutting edges of said at least one fixed member and thereby shearing off the ends of the leads of a component and the forcing member being operative to insert the leads of the component with cut leads into the holes in the relevant base member during the next operating stroke of the forcing member.

2. An automatic machine according to claim 1, including connecting means between the forcing member and said movable members such that said movable members are moved during a part only of each operating stroke and of each return stroke of the forcing member.

3. An automatic machine according to claim 2, in which a slot extending parallel to the direction of movement of the forcing member and closed at both ends is formed in each of said movable members, and two pins are secured to the forcing member, said movable members being arranged to be moved by virtue of the pins respectively engaging with ends of the slots.

4. An automatic machine according to claim 1, in which the cutting edges are respectively constituted by the edges of notches formed in said movable members and said at least one fixed member.

5. An automatic machine according to claim 4, in which said feeding means is operative during each return stroke of the forcing member to feed a component into the insertion head wherein the component is supported by virtue of its leads engaging in the notches in said movable members, said movable members being arranged to carry the component a short distance prior to its leads being cut.

6. An automatic machine according to claim 5, in which said means for bending includes a pair of anvil arms over which the leads of a component are bent, the automatic machine including means for moving the anvil arms towards and away from a position whereat they are arranged to support the leads of a component during the bending operation, and the anvil arms being arranged to be moved momentarily away from said position during each return stroke of the forcing member so as to allow the leads of a component to move into the notches of said movable members.

7. An automatic machine for mounting electrical components, each having a pair of wire leads projecting in opposite directions, on base members, the machine comprising a magazine for holding a plurality of the components, an insertion head, and feeding means for feeding one component at a time from the magazine into the insertion head, the insertion head comprising means for cutting the leads of a component to a desired length, means for bending the leads of a component so that the ends are pointed towards the base member on which the component is to be mounted, and a reciprocable forcing member for moving a component towards the base member so that the ends of the leads of the component are inserted into holes in the base member, said feeding means including pushing means actuated by movement of the forcing member for intermittently pushing at least one component towards the desired initial location of each component in the insertion head, said cutting means being operative to cut the leads of a component during a return stroke of the forcing member, and the forcing member being operative to insert the leads of this component into the holes in the relevant base member during the next operating stroke of the forcing member.

References Cited in the file of this patent

UNITED STATES PATENTS

| | | |
|---|---|---|
| 2,791,772 | Cardani | May 14, 1957 |
| 2,893,008 | Gagnon | July 7, 1959 |
| 2,903,697 | Carlzen | Sept. 15, 1959 |
| 2,908,909 | Stolecki | Oct. 20, 1959 |